(12) United States Patent
Liang (10) Patent No.: US 8,489,121 B2
(45) Date of Patent: Jul. 16, 2013

(54) INFORMATION DISTRIBUTION METHOD AND DEVICE

(75) Inventor: Jie Liang, Guangzhou (CN)

(73) Assignee: Guangzhou Ucweb Computer Technology Co., Ltd, Guangzhou (CN)

( * ) Notice: Subject to any disclaimer, the term of this patent is extended or adjusted under 35 U.S.C. 154(b) by 0 days.

(21) Appl. No.: 13/640,569

(22) PCT Filed: Feb. 14, 2012

(86) PCT No.: PCT/CN2012/071131
§ 371 (c)(1),
(2), (4) Date: Oct. 11, 2012

(87) PCT Pub. No.: WO2012/109982
PCT Pub. Date: Aug. 23, 2012

(65) Prior Publication Data
US 2013/0029692 A1    Jan. 31, 2013

(30) Foreign Application Priority Data

Feb. 15, 2011    (CN) .......................... 2011 1 0038651

(51) Int. Cl.
*H04W 24/00* (2009.01)
*H04M 3/42* (2006.01)
*G06Q 30/00* (2012.01)

(52) U.S. Cl.
USPC .................. 455/456.3; 705/14.58; 455/414.1; 701/426; 701/438; 707/E17.11

(58) Field of Classification Search
USPC ......... 455/456.1–457, 414.1–414.4; 701/426; 707/E17.11; 705/14.1–14.73
See application file for complete search history.

(56) References Cited

U.S. PATENT DOCUMENTS

| | | | |
|---|---|---|---|
| 6,175,740 B1 * | 1/2001 | Souissi et al. .............. | 455/456.3 |
| 6,456,234 B1 * | 9/2002 | Johnson ................... | 342/357.48 |
| 7,089,264 B1 * | 8/2006 | Guido et al. .......................... | 1/1 |
| 7,142,876 B2 * | 11/2006 | Trossen et al. ............. | 455/456.3 |
| 8,046,001 B2 * | 10/2011 | Shalmon et al. ........... | 455/456.3 |
| 8,239,130 B1 * | 8/2012 | Upstill et al. ................. | 701/426 |
| 2002/0004399 A1 * | 1/2002 | McDonnell et al. .......... | 455/456 |

(Continued)

FOREIGN PATENT DOCUMENTS

| | | |
|---|---|---|
| CN | 101124810 A | 2/2008 |
| CN | 101867870 A | 10/2010 |

(Continued)

*Primary Examiner* — Matthew Sams
(74) *Attorney, Agent, or Firm* — Anova Law Group, PLLC (57) ABSTRACT

The present invention provides an information distribution method based on geographical location information of a mobile terminal. The method includes obtaining current geographical location information of the mobile terminal; based on an acquiring mode used to obtain the current geographical location information, determining a positioning accuracy of the mobile terminal's current geographical location information; based on the determined positioning accuracy, determining a distribution mode used to distribute information to the mobile terminal, wherein the distribution mode includes a location-based distribution mode and the combination mode of location-based distribution and relation-based distribution; and distributing information to the mobile terminal using the determined distribution mode.

This method may be used to accurately distribute to the mobile terminal user the information related to the nearby Points of Interest (POIs) within a predetermined distance range from the current geographical location of the mobile terminal or related to the similar POIs having the same type of the current POI of the mobile terminal user, such as coupons, advertisement information, and/or POI characteristic information.

14 Claims, 4 Drawing Sheets

U.S. PATENT DOCUMENTS

| | | | |
|---|---|---|---|
| 2002/0032035 A1* | 3/2002 | Teshima | 455/456 |
| 2002/0038180 A1* | 3/2002 | Bellesfield et al. | 701/202 |
| 2002/0052674 A1* | 5/2002 | Chang et al. | 700/300 |
| 2002/0111172 A1* | 8/2002 | DeWolf et al. | 455/456 |
| 2002/0164999 A1* | 11/2002 | Johnson | 455/456 |
| 2006/0079248 A1* | 4/2006 | Otsuka et al. | 455/456.1 |
| 2007/0270166 A1* | 11/2007 | Hampel et al. | 455/456.3 |
| 2008/0014964 A1* | 1/2008 | Sudit et al. | 455/456.1 |
| 2008/0027635 A1* | 1/2008 | Tengler et al. | 701/209 |
| 2008/0119206 A1* | 5/2008 | Shalmon et al. | 455/456.3 |
| 2009/0047972 A1* | 2/2009 | Neeraj | 455/456.1 |
| 2009/0111462 A1* | 4/2009 | Krinsky et al. | 455/423 |
| 2010/0026526 A1* | 2/2010 | Yokota | 340/996 |
| 2010/0184453 A1* | 7/2010 | Ohki | 455/456.3 |
| 2010/0198826 A1* | 8/2010 | Petersen et al. | 707/737 |
| 2011/0238301 A1* | 9/2011 | Lee | 701/207 |

FOREIGN PATENT DOCUMENTS

| | | |
|---|---|---|
| CN | 101895816 A | 11/2010 |
| CN | 101959126 A | 1/2011 |
| CN | 102158802 A | 8/2011 |
| EP | 1987323 A1 | 8/2007 |

* cited by examiner

Relation-based Distribution
Distributing information based on relationship to the current POI

INFORMATION DISTRIBUTION METHOD AND DEVICE

TECHNOLOGY FIELD

The present invention relates to the field of mobile positioning applications and, more particularly, to information distribution methods and devices based on the geographical location information of a mobile terminal.

BACKGROUND

As product and service businesses keep increasing, more and more products and services are available on the market for users to select. The business owners usually utilize sales promotion and advertising, such as sending out coupons or using extensive advertising for a particular product or service, to ensure the product and service being well-recognized and purchased by a large amount of customers.

However, in today's society, the pace of life accelerates, people's activities normally cover a large area and they may not stay in a particular place for a long time. Therefore, it may not be very effective if the companies distribute coupons and advertisements at a fixed location. In other words, there may not be many people being able to get the coupons or watch their advertisements at a fixed location.

As the mobile terminals are being used more and more extensively, it becomes a trend to use the mobile terminals to distribute coupons and advertisements. For example, the companies may send bulk messages with the coupons and advertisements for a product or service to the mobile terminal users within a certain phone number segment. This may greatly increase the number of users receiving the coupons and advertisements for the product or service.

As for the users, they would like to obtain coupons and advertising distribution information conveniently at their current locations. That is, they want to obtain the coupons and advertisement information from the commercial stores within a certain area of their current locations so that they can easily obtain and use them. However, the above-mentioned bulk messaging mechanism does not consider the geographical locations of the mobile terminal users who receive the distributed coupons and advertisements. Thus, the mobile terminal users may receive the coupons and advertisements distributed by the businesses located far from their current locations instead of the coupons and advertisement distributed by the businesses within a certain range of their current locations. Therefore, the end users may not be able to obtain and use the coupons conveniently.

Therefore, there is a need for methods and devices to accurately distribute information based on the geographical location information of the mobile terminals.

SUMMARY OF THE INVENTION

Therefore, the present invention provides an information distribution method and device based on the current geographical location information of a mobile terminal. By using the disclosed information distribution method and device, based on the positioning accuracy of the mobile terminal's current geographical location information, the distribution mode, e.g., a location-based distribution mode or a combination mode of location-based distribution and relation-based distribution, can be determined for delivering information to the mobile terminal. Thus, the mobile terminal can be delivered accurately with the information related to the nearby Points of Interests (POIs) within a predetermined distance from the mobile terminal's current geographical location or related to the similar POIs having the same type as the current POI of the mobile terminal, such as coupons, advertisement information, and/or POI characteristic information.

According to one aspect of the present invention, an information distribution method based on the mobile terminal's geographical location is provided. The method includes: obtaining current geographical location information of the mobile terminal; based on an acquiring mode used to obtain the current geographical location information, determining a positioning accuracy of the mobile terminal's current geographical location information; based on the determined positioning accuracy, determining a distribution mode used to distribute information to the mobile terminal, wherein the distribution mode includes a location-based distribution mode and a combination mode of location-based distribution and relation-based distribution; and distributing information to the mobile terminal using the determined distribution mode.

In one embodiment, based on the determined positioning accuracy, determining the distribution mode further includes comparing the determined positioning accuracy with a predetermined threshold; when the determined positioning accuracy is greater than the predetermined threshold, using the location-based distribution mode to distribute the information to the mobile terminal; and when the determined positioning accuracy is less than or equal to the predetermined threshold, using the combination mode of location-based distribution and relation-based distribution to distribute the information to the mobile terminal.

In addition, wherein using the location-based distribution mode to distribute the information to the mobile terminal further includes based on the determined current geographical location of the mobile terminal, searching nearby POIs within a predetermined distance from the mobile terminal's current geographical location; and distributing information related to the searched nearby POIs to the mobile terminal.

In addition, wherein using the combination mode of location-based distribution and relation-based distribution to distribute the information to the mobile terminal further includes determining a current POI of the mobile terminal; based on the mobile terminal's current POI, searching nearby POIs within a predetermined distance range from the current geographical location of the mobile terminal and similar POIs having a same types as the current POI of the mobile terminal; and distributing the information related to the searched nearby POIs and the similar POIs to the mobile terminal.

In addition, the distributed information may include coupons, advertisement information, and/or POI characteristic information. For example, the characteristic information of POIs may include, for example, movie notifications or movie reviews from nearby movie theatres, or show information or sports event information from nearby sport stadiums.

According to another aspect of the present invention, an information distribution device based on geographical location information of a mobile terminal is provided. The device includes: a geographical location information acquiring unit configured to obtain current geographical location information of the mobile terminal; a positioning accuracy determining unit configured to, based on an acquiring mode used to obtain the current geographical location information of the mobile terminal, determine a positioning accuracy of the current geographical location information of the mobile terminal; a distribution mode determining unit configured to, based on the determined positioning accuracy, determine a distribution mode used to distribute information to the mobile terminal, wherein the distribution mode includes a location-based distribution mode and a combination mode of location-based distribution and relation-based distribution; and an information distributing unit configured to distribute information to the mobile terminal based on the determined distribution mode.

In addition, preferably, the distribution mode determining unit further includes: a comparing unit configured to compare the determined positioning accuracy with a predetermined threshold value; and a distribution mode selecting unit configured to, when the determined positioning accuracy is larger than the predetermined threshold value, select the location-based distribution mode to distribute the information to the mobile terminal, and, when the determined positioning accuracy is less than or equal to the predetermined threshold value, to select the combination mode of location-based distribution and relation-based distribution to distribute the information to the mobile terminal.

In addition, when the location-based mode is used to distribute the information to the mobile terminal, the information distributing unit further includes: a nearby POI searching unit configured to, based on the determined current geographical location information of the mobile terminal, search the nearby POIs within a predetermined distance of the mobile terminal's geographical location; and the information distributing unit distributes the information related to nearby POIs to the mobile terminal.

In addition, when the combination mode of location-based distribution and relation-based distribution is used to distribute the information to the mobile terminal, the information distributing unit further includes: a current POI determining unit configured to determine a current POI of the mobile terminal; a nearby POI searching unit configured to, based on the mobile terminal's current POI, search nearby POIs within a predetermined distance from the mobile terminal's current POI; a similar POI searching unit configured to, based on the mobile terminal's current POI, search similar POIs having a same type as the mobile terminal's current POI, wherein the information distributing unit distributes the information related to nearby POIs and the similar POIs to the mobile terminal.

In addition, the distributed information may include coupons, advertisement information and/or POI characteristic information.

According to another aspect of the present invention, a server including the above described information distribution device is provided.

In order to achieve the above and other related objectives, one or more aspects of the present invention include those features to be described in detail as follows and particularly pointed out in the claims. The following descriptions and accompanying drawings describe in detail certain illustrative aspects of the present invention. However, these aspects only illustrate some of the ways in which the principle of the present invention may be used. In addition, the present invention intends to include all these aspects and their equivalents.

Beneficial Effects

By using the above methods and devices, it can determined, based on the positioning accuracy of the mobile terminal's current location information, whether to use a location-based distribution mode or a combination mode of location-based distribution and relation-based distribution to deliver information, such as coupons, advertisement information and/or POI characteristic information, to the mobile terminal. Thus, the mobile terminal can be delivered accurately with the information related to the nearby POIs within a predetermined distance from the mobile terminal's current geographical location or the similar POIs having the same type as the current POI of the mobile terminal, such as coupons, advertisement information, and/or POI characteristic information. The user experience can be enhanced, and information distribution efficiency can also be improved.

BRIEF DESCRIPTION OF THE DRAWINGS

By referring to the descriptions of the accompanying drawings and the claims, and with a full understanding of the present invention, other objectives and results of the present invention will be clearer and easily understand. In the drawings:

The same label may be used in all drawings to indicate similar or corresponding features or functions.

DETAILED DESCRIPTIONS

In the following description, for purposes of illustration, many specific details are illustrated in order to provide a full understanding of one or more embodiments. However, obviously, those embodiments can also be implemented without these specific details. In other examples, in order to conveniently describe one or more embodiments, a known structure or device may be shown in a block diagram.

Individual embodiments of the present invention will now be described in detail in reference to the accompanying drawings.

Figure 1:
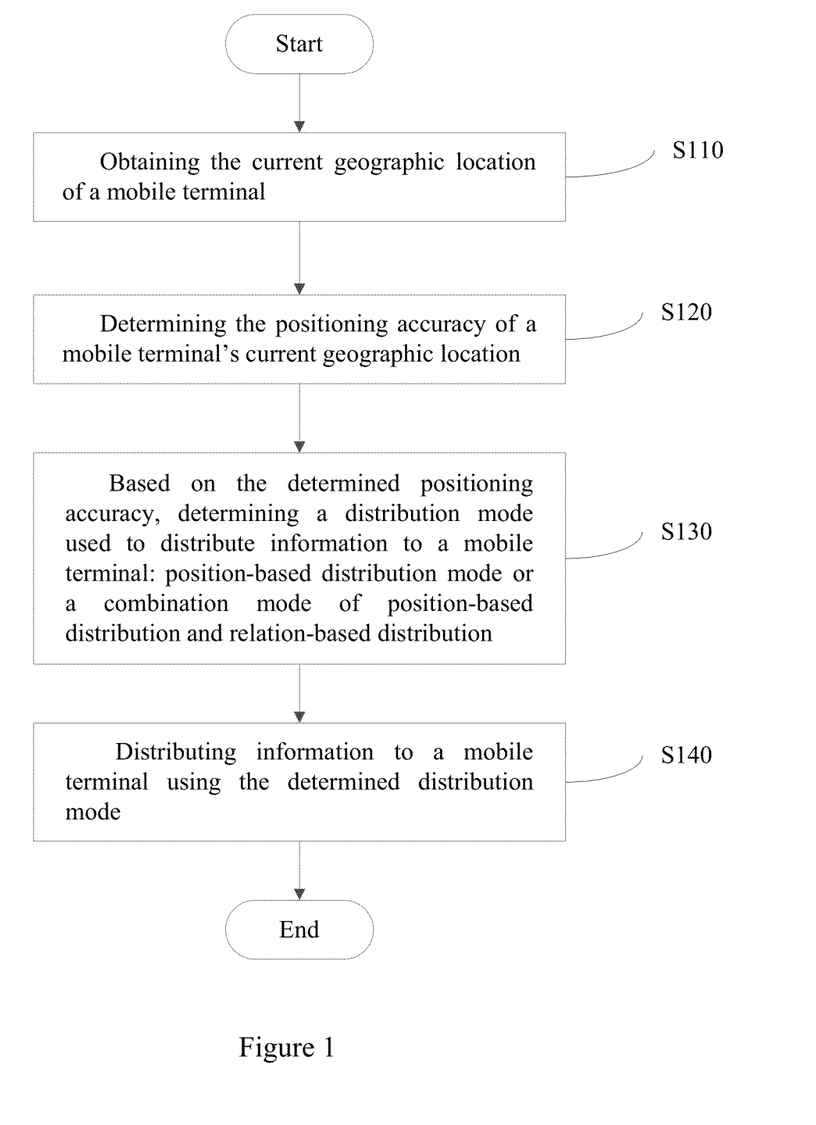
FIG. 1 shows a flow chart of an information distribution method based on the geographical location information of the mobile terminal according to one embodiment of the present invention.

FIG. 1 shows a flow chart of an information distribution method based on the geographical location information of the mobile terminal according to one embodiment of the present invention.

As shown in FIG. 1, the current geographical location of the mobile terminal is first obtained in S110. For example, the mobile terminal user can, via a mobile terminal browser, use the mobile positioning technologies provided by the mobile terminal to obtain the mobile terminal user's current geographical location information. The mobile positioning technologies may include base station positioning, GPS (Global Positioning System) positioning, and WiFi (Wireless Fidelity) positioning, etc.

The base station positioning or location service is also called location based service (LBS). LBS obtains the mobile terminal user's geographical location information (e.g., latitude and longitude coordinates) via telecom mobile operators' networks, such as GSM (Global System of Mobile Communication) network and CDMA (Code Division Multiple Access) network, and, supported by an electronic map platform, provides the appropriate services to mobile users, such as M-Zone dynamic location query service provided by China Mobile. While performing base station positioning, a mobile phone usually measures downlink pilot signals from different base stations, obtains Times of Arrival (TOAs) of downlink pilots from different base stations, and then calculates the location of the mobile terminal using trigonometric formula estimation algorithm based on the measurement results and the coordinates of the base stations. The positioning accuracy may usually be 800 m for base station positioning.

The GPS positioning uses GPS signals to determine the location of a mobile terminal There are normally two methods used for the mobile terminal GPS positioning. In the first method, the mobile terminal location is determined by the number signals used by the mobile terminal. Thus, the mobile terminal location is actually determined by the base station location. This type of positioning has a relatively large margin of error, generally more than 500 m. In the second method, a GPS chip inside the mobile terminal is utilized for mobile positioning. Such type of positioning is implemented by using United States GPS system with a positioning deviation normally within 20 m. The second method is often used for current mobile positioning.

The WiFi positioning is a technique for mobile positioning by collecting the location information of the WiFi access points, and the positioning accuracy is normally in a range of 10-50 m.

After the current geographical location of mobile terminal is obtained, in S120, the positioning accuracy of the mobile terminal's current location information can be determined based on the acquisition mode of the current geographical location information of the mobile terminal. For example, the acquisition mode for obtaining the mobile terminal's current geographical location can be first determined as base station positioning, GPS positioning, or WiFi positioning. The positioning accuracy of the mobile terminal's location information can then be determined. Generally, the positioning accuracy of the base station positioning is within a range of 800 m, the positioning accuracy of the GPS positioning is within a range of 20 m (using the second GPS positioning method), and the WiFi positioning accuracy is within a range of 50 m. The base station positioning, the GPS positioning, and WiFi positioning are described here as examples. Obviously, other mobile positioning techniques may also be used and their positioning accuracies are also known.

After the positioning accuracy is determined, in S130, according to the determined positioning accuracy, an information distribution mode, e.g., a location-based distribution mode or a combination mode of location-based distribution and relation-based distribution, can be determined for delivering or pushing information to the mobile terminal. The delivered information may include coupons, advertisement information, and/or POI characteristic information. The characteristic information of POIs may include, for example, movie notifications or movie reviews from nearby movie theatres, or show information or sports event information from nearby sport stadiums, etc.

For example, first, the determined positioning accuracy may be compared with a predetermined threshold value, e.g., a threshold value of 100 m. It should be noted that other suitable value may be selected as the predetermined threshold value as needed. When the determined positioning accuracy is greater than the predetermined threshold value, such as when the base station positioning technique is employed, it may be unable to determine a precise location due to the relatively large positioning deviation. That is, a current POI of the mobile terminal cannot be accurately determined. In this situation, the location-based mode is used to deliver to the mobile terminal with the information, such as coupons, advertisement information, and/or POI characteristic information. On the other hand, when the determined positioning accuracy is less than or equal to the predetermined threshold value, such as when GPS positioning or WiFi positioning is used, a precise location can be obtained, because the positioning deviation for the GPS or WiFi positioning is relatively small. That is, the current POI of mobile terminal can be accurately determined. In this case, the combination mode of location-based distribution and relation-based distribution is used to deliver the information, such as coupons, advertisement information, and/or POI characteristic information, to the mobile terminal.

Further, in S140, according to the determined distribution mode, the information, such as coupons, advertisement information and/or POI characteristics information, is distributed to the mobile terminal.

Figure 2:
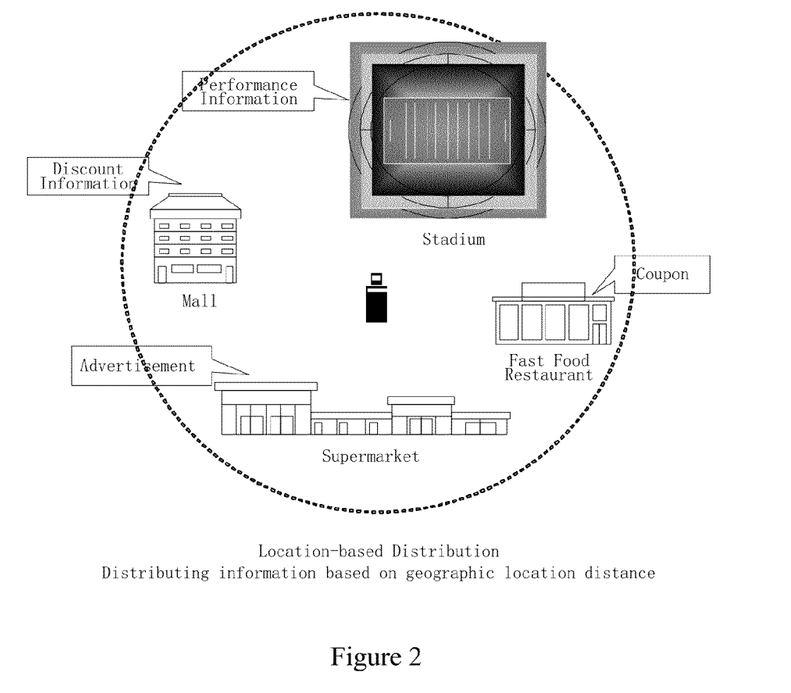
FIG. 2 shows a schematic diagram of using a location-based distribution mode.

More specifically, when the location-based distribution mode is used to deliver information such as coupons and advertisement information, to the mobile terminal, firstly, based on the determined current geographical location information of the mobile terminal, the nearby POIs within a predetermined distance (for example, 50 m) of the mobile terminal's current geographic position will be searched. Then, the contents related to the searched nearby POIs, such as coupons, advertisement information and/or POI characteristic information, will be delivered to the mobile terminal. That is, the location-based distribution mode is a distribution mode used to push the information related to nearby POIs within a predetermined distance range of the mobile terminal's current geographic position to the mobile terminal. FIG. 2 illustrates the location-based distribution mode used for delivering contents such as coupons, advertisement information and/or POI characteristic information.

In addition, when the combination mode of location-based distribution and relation-based distribution is used to deliver contents such as coupons, advertising information, and/or POI characteristic information, to the mobile terminal, the current POI of the mobile terminal may be determined first. After the current POI of the mobile terminal is determined, and based on the current POI of the mobile terminal, the nearby POI within a predetermined distance (for example, 50 m) of the current POI of the mobile terminal or the similar POIs having the same type as that of the current POI of the mobile terminal are searched.

As used herein, a similar POI refers to a POI having the same type of the current POI. For example, if the current POI is a McDonald chain restaurant or certain brand beauty salon chain, the similar POIs are other McDonald's chain restaurants or other brand beauty chain salon. Or, the similar POIs refer to the POIs in the same category as the current POI when POIs are categorized in accordance with interests, hobbies, tastes, characteristics, etc. Then, the contents searched from the nearby POIs and the similar POIs are delivered or pushed to the mobile terminal.

Figure 3:
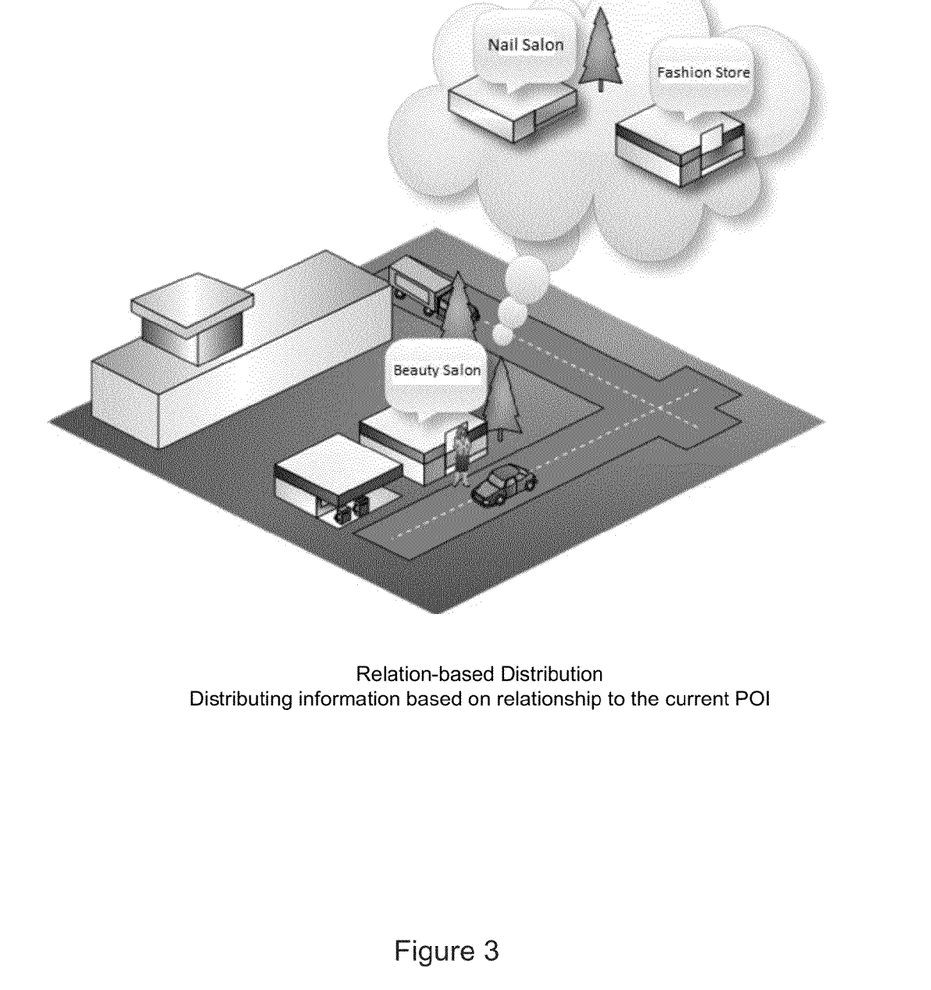
FIG. 3 shows a schematic diagram of using a relation-based distribution mode.

In other words, the relation-based distribution mode is used to deliver the information related to the similar POIs to the current POI of the mobile terminal. FIG. 3 illustrates the relation-based mode used for delivering contents such as coupons and advertisement information. Obviously, a combination of FIG. 2 and FIG. 3 would be representing the combination mode of location-based distribution and relation-based distribution used for delivering contents such as coupons and advertisement information.

It should be noted herein that, before using the disclosed methods to deliver coupons and advertising information, the geographical location information may be assigned to the coupons, advertisement information and/or POI characteristic information provided by the businesses. For example, based on the commercial names, addresses and discount information provided by the businesses, the geographical location information can be automatically assigned to such information. According to different numbers of the assigned geographical locations, the discount information is divided into two types:

a) Single Discount Information

The discount and advertisement information is linked to a single POI, such as concert information at Beijing Workers' Stadium. This discount information is linked to a single coordinate location, i.e., the POI.

b) Chain Discount Information

The chain discount and advertisement information are linked with a series of POIs, such as McDonald's discount information.

With the information provided by the businesses, the following methods may be used to link the geographical locations to that information.

1) Searching POI database by names of the businesses. If the business name is directly linked to one POI, the geographical location of the discount information is the same as that of the POI. For example: a) Information of Andy Liu Concert at the Beijing Workers Stadium: the coordinates of the POI, the Beijing Workers Stadium are directly linked; b) a store in the Oriental Plaza: the coordinates of POI, the Oriental Plaza, are directly linked.

2) When a business may be not-so-well-recognized or does not belong to a certain POI, the business's coordinates can be queried using the business' address, such as No. 332, Pingan Street.

3) Assigning the coordinates manually.

It should be noted that, the above described method can be achieved using the mobile terminal.

The above describes the information distribution method of the present invention based on the mobile terminal's geographical location information in reference to the accompanying drawings FIG. 1, FIG. 2 and FIG. 3. The above described information distribution method, based on the mobile terminal's geographical location information, can be implemented using software, hardware, or a combination of software and hardware.

Figure 4:
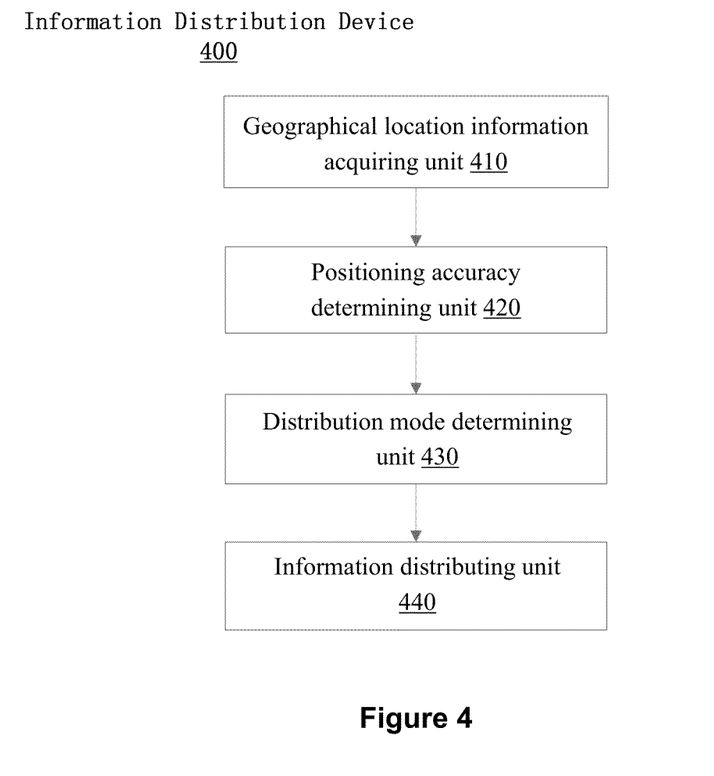
FIG. 4 shows a block diagram of an information distribution device based on the geographical location information of the mobile terminal according to one embodiment of the present invention.

FIG. 4 shows a schematic block diagram of an information distribution device 400 based on the geographical location information of the mobile terminal. As shown in FIG. 4, according to the present invention, the information distribution device 400 includes a geographical location information acquiring unit 410, a positioning accuracy determining unit 420, a distribution mode determining unit 430, and an information distributing unit 440.

First, the geographical location information acquiring unit 410 acquires the current geographical location of the mobile terminal. For example, the mobile terminal user can obtain his current geographical location information via a mobile terminal browser utilizing the mobile positioning technologies within the mobile terminal. The mobile positioning technologies may include base station positioning, GPS positioning and WiFi (Wireless Fidelity) positioning.

After the current geographical location information of the mobile terminal is acquired, a positioning accuracy determining unit 420 determines the positioning accuracy of the mobile terminal's current geographical location information based on an acquiring mode used to obtain the current geographical location information of the mobile terminal. For example, the positioning accuracy determining unit 420 may first decide which acquiring method, base station positioning, GPS positioning, or WiFi positioning, is used to acquire the mobile terminal's current geographical location information, and then determines the positioning accuracy of the mobile terminal's geographical location information. Typically, the positioning accuracy of the base station positioning is within a range of 800 m. Normally, the positioning accuracy of the GPS positioning is within a range of 20 m (when using the second method). WiFi positioning accuracy is within a range of 50 m. The base station positioning, the GPS positioning and WiFi positioning are described here as examples. Obviously, other mobile positioning techniques may also be used and their positioning accuracies may also be known.

After the positioning accuracy is determined, the distribution mode determining unit 430 is used to, based upon the determined positioning accuracy, determine whether to use the location-based distribution mode or the combination mode of location-based distribution and relation-based distribution for delivering information to the mobile terminal, such as coupon, advertising information, and/or POI characteristic information. In one embodiment, the distribution mode determining unit 430 may include a comparing unit (not shown) and a distribution mode selection unit (not shown). The comparing unit may compare the determined positioning accuracy with the predetermined threshold value. When the determined positioning accuracy is greater than the predetermined threshold value, the distribution mode selection unit selects the location-based distribution mode for delivering or pushing coupons and advertisement information to the mobile terminal. When the determined positioning accuracy is less than or equal to the predetermined threshold value, the distribution mode selection unit selects the combination mode of location-based distribution and relation-based distribution for delivering the coupons and advertisement information to the mobile terminal.

After the distribution mode is determined, the information distributing unit 440 delivers or pushes information to the mobile terminal based on the determined distribution mode. When the location-based distribution mode is used to push information to the mobile terminal user, the information distributing unit 440 may also include a nearby POI searching unit (not shown). The nearby POI searching unit is used to, based on the determined current geographical location information of the mobile terminal, search nearby POIs within a predetermined distance (for example, 50 m) of the current geographical location of the mobile terminal. Thereafter, the information distributing unit 440 may deliver or push information related to the nearby POIs from the nearby POI searching unit to the mobile terminal.

In addition, when the combination mode of location-based distribution and relation-based distribution is used to deliver information to the mobile terminal, the information distributing unit 440 may also include a current POI determining unit (not shown), a nearby POI searching unit (not shown), and a similar POI searching unit (not shown). The current POI determining unit determines the mobile terminal's current POI. Based on the mobile terminal's current POI, the nearby POI searching unit searches nearby POIs within a range of the predetermined distance (for example, 50 m) away from the mobile terminal's current POI. Based on the mobile terminal's current POI, the similar POI searching unit searches similar POIs of the current POI. Thereafter, the information distributing unit 440 delivers the information related to the nearby POIs and similar POIs to the mobile terminal.

Figure 5:
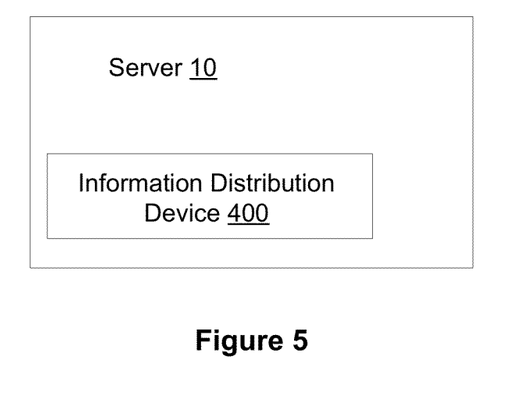
FIG. 5 shows a block diagram of a server including the information distribution device according to the present invention.

It should be noted that, the information distribution device 400 can be configured in a server. FIG. 5 shows a server 10 including the information distribution device 400 of the present invention.

Typically, the mobile terminal in the present invention may include any appropriate terminal equipment capable of webpage browsing, such as mobile phones and personal digital assistants, and the scope of the present invention should not be limited to any specific type of mobile terminal.

In addition, the method of the present invention can also be realized in computer programs executed by the CPU. When the computer programs are executed by the CPU, the above described functionalities defined in the method of the present invention can be performed.

In addition, the above method steps and system units can be realized by a controller or processor, and a computer-readable storage medium storing computer programs capable of making the controller or processor to realize the above method steps or system units.

In addition, it should be clear that the described computer-readable storage media (e.g., memory) may be volatile memory or non-volatile memory, or may include volatile memory and nonvolatile memory. As a non-limiting example, nonvolatile memory can include read-only memory (ROM), programmable ROM (PROM), erasable programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage media include but not limited to these and other suitable types of memory.

Those skilled in the art understand that the disclosed various exemplary logic blocks, modules, circuits and algorithm steps can be implemented in electronic hardware, computer software or a combination thereof. In order to clearly illustrate the interchangeability between the hardware and software, the functions of the various exemplary components, blocks, modules, circuits and algorithm steps have been generally described. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be designed using the following components performing the disclosed functionalities: general-purpose processor, digital signal processor (DSP), application specific integrated circuits (ASICs), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or in a combination of both. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

Although the previously disclosed information illustrates exemplary embodiments of the present invention, it should be noted, however, various changes and modifications can be made without departing from the scope of the present invention defined in the claims. According to the embodiments of the present invention, the functions, steps and/or actions in the method claims are not required to be executed in a particular order. In addition, although the elements of the present invention may be described or requested individually, they can also be assumed to be plural, unless they are clearly limited to a single number.

Although the present invention has been disclosed together with the preferred embodiments which is shown and described in detail, those skilled in the art understand that various improvements can be made to the above described information distribution methods and devices based on the mobile terminal's geographic position information, without departing from the contents of the present invention. Therefore, the scope of the present invention should be defined by the attached claims.

The invention claimed is:

1. An information distribution method based on geographical location information of a mobile terminal, comprising:
   obtaining current geographical location information of the mobile terminal;
   based on an acquiring mode used to obtain the current geographical location information of the mobile terminal, determining a positioning accuracy of the mobile terminal's current geographical location information;
   based on the determined positioning accuracy, determining a distribution mode used to distribute information to the mobile terminal, wherein the distribution mode includes a location-based distribution mode, where information of a plurality of nearby points of interest (POIs) determined based on current geographical location information of a first positioning accuracy is distributed to the mobile terminal, and a combination mode of location-based distribution and relation-based distribution, where a current POI is determined based on current geographical location information of a second positioning accuracy, nearby POIs having a same type as the current POI are automatically searched, and information of the POIs having the same type as the current POI is distributed to the mobile terminal; and
   distributing information to the mobile terminal using the determined distribution mode.

2. The method according to claim 1, wherein, based on the determined positioning accuracy, determining the distribution mode further includes:
   comparing the determined positioning accuracy with a predetermined threshold value;
   when the determined positioning accuracy is greater than the predetermined threshold value, using the location-based distribution mode to distribute the information to the mobile terminal; and
   when the determined positioning accuracy is less than or equal to the predetermined threshold value, using the combination mode of location-based distribution and relation-based distribution to distribute the information to the mobile terminal.

3. The method according to claim 2, wherein using the location-based distribution mode to distribute the information to the mobile terminal further includes:
based on the determined current geographical location information of the mobile terminal, searching the nearby POIs within a predetermined distance from the mobile terminal's current geographical location; and
distributing information related to the searched nearby POIs to the mobile terminal.

4. The method according to claim 1, wherein the distributed information includes coupons, advertisement information, and/or POI characteristic information.

5. An information distribution device based on geographical location information of a mobile terminal, comprising:
a geographical location information acquiring unit configured to obtain current geographical location information of the mobile terminal;
a positioning accuracy determining unit configured to, based on an acquiring mode used to obtain the current geographical location information of the mobile terminal, determine a positioning accuracy of the current geographical location information of the mobile terminal;
a distribution mode determining unit configured to, based on the determined positioning accuracy, determine a distribution mode used to distribute information to the mobile terminal, wherein the distribution mode includes a location-based distribution mode, where information of a plurality of nearby points of interest (POIs) determined based on current geographical location information of a first positioning accuracy is distributed to the mobile terminal, and a combination mode of location-based distribution and relation-based distribution, where a current POI is determined based on current geographical location information of a second positioning accuracy, nearby POIs having a same type as the current POI are automatically searched, and information of the POIs having the same type as the current POI is distributed to the mobile terminal; and
an information distributing unit configured to distribute information to the mobile terminal based on the determined distribution mode.

6. The device according to claim 5, wherein the distribution mode determining unit further includes:
a comparing unit configured to compare the determined positioning accuracy with a predetermined threshold value; and
a distribution mode selecting unit configured to, when the determined positioning accuracy is larger than the predetermined threshold value, select the location-based distribution mode to distribute the information to the mobile terminal, and, when the determined positioning accuracy is less than or equal to the predetermined threshold value, to select the combination mode of location-based distribution and relation-based distribution to distribute the information to the mobile terminal.

7. The device according to claim 6, wherein, when the location-based mode is used to distribute the information to the mobile terminal, the information distributing unit further includes:
a nearby POI searching unit configured to, based on the determined current geographical location information of the mobile terminal, search the nearby POIs within a predetermined distance of the mobile terminal's geographical location; and
the information distributing unit distributes the information related to nearby POIs to the mobile terminal.

8. The device according to claim 6, wherein, when the combination mode of location-based distribution and relation-based distribution is used to distribute the information to the mobile terminal, the information distributing unit further includes:
a current POI determining unit configured to determine the current POI of the mobile terminal;
a nearby POI searching unit configured to, based on the mobile terminal's current POI, search the nearby POIs within a predetermined distance from the mobile terminal's current POI;
a similar POI searching unit configured to, based on the mobile terminal's current POI, search similar POIs having the same type as the mobile terminal's current POI;
wherein the information distributing unit distributes the information related to nearby POIs and the similar POIs to the mobile terminal.

9. The device according to claim 5, wherein the distributed information includes coupons, advertisement information, and/or POI characteristic information.

10. A server, comprising the device according to claim 5.
11. A server, comprising the device according to claim 6.
12. A server, comprising the device according to claim 7.
13. A server, comprising the device according to claim 8.
14. A server, comprising the device according to claim 9.

* * * * *